Figure 1:
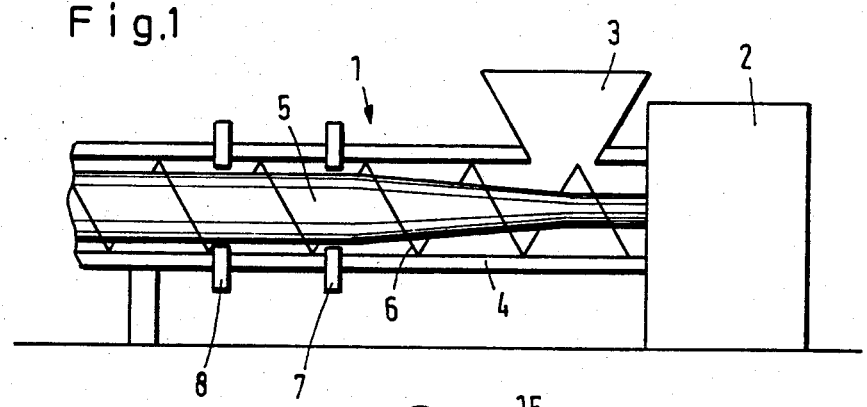

United States Patent [19]

Anders

[11] Patent Number: 4,508,454
[45] Date of Patent: Apr. 2, 1985

[54] EXTRUDER

[75] Inventor: Dietmar Anders, Hanover, Fed. Rep. of Germany

[73] Assignee: Hermann Berstorff Maschinenbau GmbH, Hanover, Fed. Rep. of Germany

[21] Appl. No.: 498,170

[22] Filed: May 25, 1983

[30] Foreign Application Priority Data

Jun. 7, 1982 [DE] Fed. Rep. of Germany ....... 3221472

[51] Int. Cl.³ .............................................. B29B 1/06
[52] U.S. Cl. ........................................ 366/80; 366/90; 366/601
[58] Field of Search .................. 366/149, 183, 79, 80, 366/83, 88, 90, 81, 75, 76, 96–99, 302, 307, 318, 324, 132; 425/207–209, 154; 241/36; 100/48, 53, 117

[56] References Cited

U.S. PATENT DOCUMENTS 4,178,104 12/1979 Menges et al. .................. 366/90 X
4,361,081 11/1982 Howard .

Primary Examiner—Timothy F. Simone
Attorney, Agent, or Firm—Schwartz, Jeffery, Schwaab, Mack, Blumenthal & Koch

[57] ABSTRACT

In an extruder, for extruding thermoplastic synthetic material or rubber or for use for pressing water out of a material, a screw rotates in a cylindrical chamber and helical conveying lands provided on the screw are interrupted at positions at which pins project into the chamber thereby forming grooves to receive the pins. To sense breakage of a pin, for example caused by metal particles in the extrudate, signal-generating means are provided in a blind bore in each pin, receipt of a signal from the signal generating means causing the screw to be stopped from rotating thereby to prevent further damage.

5 Claims, 4 Drawing Figures

EXTRUDER

The invention relates to an extruder for processing thermoplastics synthetic material or rubber or for pressing water from paper pulps, bark or other solid liquid mixtures.

Extruders of this kind, for example as known from U.S. Pat. No. 4,199,263 to Menges et al. and DE-OS No. 30 03 615, issued to the assignee of the present invention, may comprise a cylinder, a screw rotatable in the cylinder, drive means for rotating the screw, at least one helical land on the screw, and a plurality of pins extending radially through the wall of the cylinder towards the axis of the screw, the helical land or lands being interrupted at positions at which the pins extend into the cylinder. Such extruders have proved very successful in practice, since they can give a substantial output while at the same time keeping the extrudate at a relatively low temperature.

In such so-called pin-cylinder extruders it often happens that, despite the use of metal detectors at the inlet to the extruder, a pin breaks off. This is because metal particles are sometimes present in the extrudate to be processed and these particles may take up a position between one of the stationary pins and the rotating ends of the lands, thus causing the pin to break.

Another reason why a pin can break is material fatigue, since the end of the pin projecting into a rubber mixture is under a considerable load.

Even if only one pin breaks off, e.g. one in a first radial row of pins, massive consequential damage can result. This is because the piece broken off can become mortised between the screw land and the cylinder, so that the cylinder and lands are damaged.

Also, as the broken piece of pin is conveyed further downstream, it can cause other pins to break off, particularly if the broken off piece of pin is held back by a further pin in a following radial row of pins and then takes up a position between the further pin and the ends or beginnings of the lands. The further pin then also breaks off.

This process is repeated downstream at each successive radial row of pins, so that the pins, the lands and the cylinder are considerably damaged.

The invention has among its objects to provide means for avoiding damage caused by broken pins.

According to the invention there is provided an extruder for processing thermoplastic synthetic material or rubber or for pressing water from paper pulps, bark or other solid-liquid mixtures, the extruder comprising a cylinder, a screw rotatable in the cylinder, drive means for rotating the screw, at least one helical land on the screw, and a plurality of pins extending radially through the wall of the cylinder towards the axis of the screw, the helical land or lands being interrupted at positions at which the pins extend into the cylinder, wherein each pin has an axial blind bore therein closed at the end of the pin which is towards the axis of the screw, means for signalling breakage of the pin is disposed in each blind bore, and said means communicates with a device for disconnecting the drive means for the screw.

By forming narrow blind bores in the pins projecting into the cylindrical chamber, and by providing said means to signal the breakage of a pin, any breakage of a pin is signalled immediately, so that the drive means for the screw is disconnected and further damage thereby effectively avoided.

The means disposed in the blind bore may for example be an insulated electric cable carrying voltage. In the case of the pin breaking the cable is ruptured and thus generates a signal to disconnect the screw drive and prevent further damage.

Alternatively a gas or hydraulic fluid, at a pressure higher than that in the extruder cylinder, may be provided in the blind bore in the pin. If the pin is sheared off, the pressure of the gas or hydraulic fluid drops and a contact manometer switches off the drive for the screw.

A further embodiment of the invention provides for a contact pin to be disposed in the blind bore in the pin. The contact pin then extends approximately to the interior of the cylinder and is connected to a limit switch.

If the pin is broken off, extrudate enters the now open bore therein and presses the contact pin outwards against the limit switch to disconnect the screw drive and avoid further damage.

Figure 2:
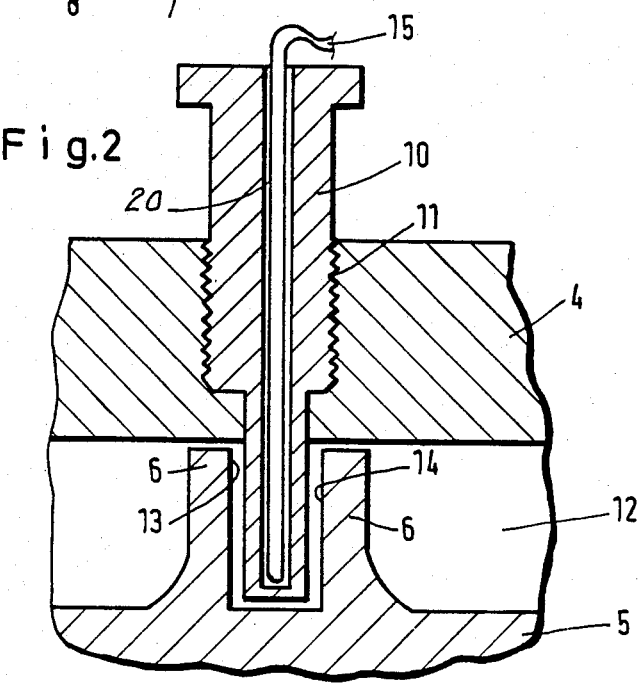
Figure 4:
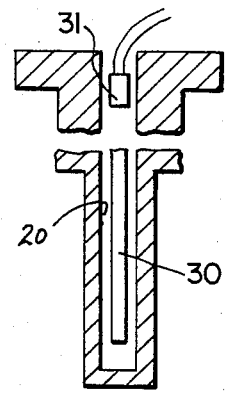
Figure 3:
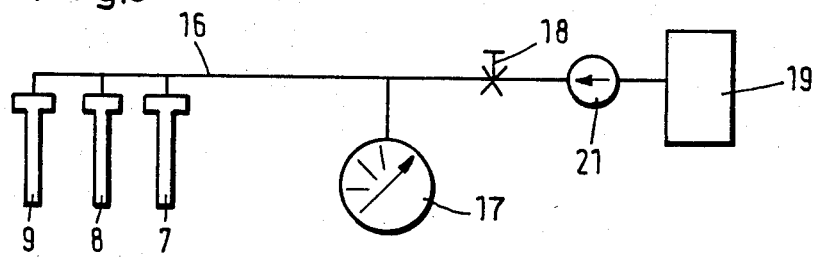

The invention is diagrammatically illustrated by way of example in the accompanying drawing, in which:

FIG. 1 shows an extruder according to the invention;
FIG. 2 shows a pin of the extruder of FIG. 1;
FIG. 3 shows an example of a hydraulic sensing circuit of an extruder according to the invention, and
FIG. 4 shows a further embodiment of the invention.

Referring to the drawing, an extruder 1, as shown in FIG. 1, comprises a drive 2, a feed aperture 3 in a cylinder 4 and a screw 5 mounted in the cylinder 4 and drivable by the drive 2. Lands 6 extending in a helical shape are provided on the screw 5.

Pins extend through the cylinder 4 and are grouped into groups 7 and 8; the pins of each group of pins lying in the same plane. The individual pins point towards the axis of the screw, are distributed around the periphery of the cylinder 4 and project through it at equal spacings.

FIG. 2 shows details of a pin 10 which is screwed into the cylinder 4 by means of thread 11. The pin 10 extends into the bore cavity 12 of the cylinder 4 almost to the base of the screw 5. At the location of the pin 10 the helical lands 6 have been milled away to form a circumferential groove having opposite side walls 13 and 14.

Material to be extruded or to have water pressed out of it is placed in the feed aperture 3. Rotation of the screw 5 conveys it within the bore cavity 12 towards a discharge aperture, and the pins prevent the material from rotating with the screw 5. If the extruder is used for pressing water out of the material, liquid drain apertures are provided in the cylinder 5.

If hard members such as metal particles are contained in the material and are conveyed to a position in front of one of the pins 10 and if the particles are larger than the free passages between the pin 10 and the sidewalls 13 and 14 or the groove in which the pin is disposed, then the particles will become wedged and cause the pin 10 to break off as a result of rotation of the screw 5.

A blind bore 20 is provided in each pin 10 and receives an insulated electric cable 15. Breakage of the pin 10 will cause the cable 15 to be ruptured, thereby breaking a circuit (not shown) or causing a drop in an applied voltage.

The voltage drop or interruption of current is presented as a signal to means for disconnecting the screw drive 2, whereby the screw 5 is immediately stopped from rotating. This prevents the broken pin 10 from causing damage in the next row of pins downstream.

FIG. 3 shows another possibility of obtaining a signal if a pin 10 should break off.

The blind bores 20 of the pins 10 of individual rows of pins 7, 8, 9 are connected to a hydraulic fluid pipe 16. A contact manometer 17 is connected to the pipe 16 and, after the pipe 16 and the blind bores 20 of the pins 10 have been pressurized from a fluid reservoir 19 by a handpump 21, the pipe circuit is closed by means of an absolutely impervious high pressure valve 18.

The maximum supercharging pressure is 500 bars and the minimum danger leakage 400 bars. If the pressure drops to 300 bars, immediate stoppage of the screw 5 is brought about by the contact manometer 17, thereby signalling that a pin 10 must have broken.

In such a case the pressure in the pipe 16 and the bores 20 of the pins 10 must be higher than the pressure of the extrudate so that, if a pin breaks, the pressure will be reduced by having hydraulic oil spurting out of the breakage point, and a disconnecting signal can thus be obtained.

FIG. 4 shows a further embodiment of the invention referred to above. In this embodiment, a contact pin 30 is disposed in the blind bore 20 of the pin. The pin 30 engages a limit switch 31 when extrudate enters the open bore consequent to pin breakage. The limit switch 31 functions to disconnect the screw drive to avoid further damage.

What is claimed is:

1. An extruder for processing material, comprising:
   (a) an extruder cylinder,
   (b) an extruding screw mounted for rotation in said cylinder, said screw being formed with a helical land on the periphery thereof, said land being formed with circumferential grooves at predetermined locations longitudinally of the land,
   (c) drive means for rotating said screw,
   (d) a plurality of pins extending radially through said cylinder toward the axis of said screw, said pins being located on said cylinder so as to be received with clearance in said grooves formed in the helical land of said screw,
   (e) each of said pins being formed with an axial blind bore closed at the radially inner end of the pin,
   (f) means disposed in each of said blind bores for signalling breakage of said pin, and
   (g) means connected to said signalling means for disconnecting said drive means for said screw thereby preventing damage due to the breakage of said pin.

2. An extruder as claimed in claim 1, wherein said means disposed in each said blind bore to signal breakage of the respective pin is an insulated cable carrying electric voltage.

3. An extruder as claimed in claim 1, wherein said means disposed in each said blind bore to signal breakage of the respective pin is pressurized hydraulic fluid.

4. An extruder as claimed in claim 1, wherein said means disposed in each said blind bore to signal breakage of the respective pin is a pressurized gas.

5. An extruder as claimed in claim 1, wherein said means disposed in each said blind hole to signal breakage of the respective said pin is a contact pin connected to a limit switch connected in circuit with said drive means, the breakage of said pin causing extrudate to pass up into said blind bore and move said contact pin radially outward to close said limit switch and disconnect said drive means.

* * * * *